(12) United States Patent
Ryu et al.

(10) Patent No.: US 8,824,427 B2
(45) Date of Patent: Sep. 2, 2014

(54) DATA TRANSMISSION METHOD AND APPARATUS OF MACHINE-TYPE COMMUNICATION DEVICE IN WIRELESS COMMUNICATION SYSTEM

(75) Inventors: Jin Sook Ryu, Anyang-si (KR); Dong Keun Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 88 days.

(21) Appl. No.: 13/637,903

(22) PCT Filed: Mar. 29, 2011

(86) PCT No.: PCT/KR2011/002125
§ 371 (c)(1),
(2), (4) Date: Oct. 5, 2012

(87) PCT Pub. No.: WO2011/122819
PCT Pub. Date: Oct. 6, 2011

(65) Prior Publication Data
US 2013/0022029 A1    Jan. 24, 2013

Related U.S. Application Data

(60) Provisional application No. 61/318,785, filed on Mar. 29, 2010.

(30) Foreign Application Priority Data

Mar. 28, 2011  (KR) .................. 10-2011-0027749

(51) Int. Cl.
*H04J 3/00*        (2006.01)
*H04W 4/00*      (2009.01)
*H04W 72/04*    (2009.01)

(52) U.S. Cl.
CPC ............ *H04W 72/042* (2013.01); *H04W 4/005* (2013.01)
USPC ........................................... 370/336; 370/329

(58) Field of Classification Search
CPC ..................... H04W 72/0406; H04W 74/002
USPC ......... 370/328–329, 335–336, 338, 340–343, 370/345, 348, 437, 441–444, 465, 479–480
See application file for complete search history.

(56) References Cited

U.S. PATENT DOCUMENTS

| | | | |
|---|---|---|---|
| 7,177,298 B2 * | 2/2007 | Chillariga et al. ............ | 370/348 |
| 7,433,334 B2 * | 10/2008 | Marjelund et al. ............ | 370/329 |
| 8,270,356 B2 * | 9/2012 | Chun et al. ................... | 370/329 |

(Continued)

OTHER PUBLICATIONS

Vodafone, "Limitation of RACH Resources for MTC Devices", 3GPP TSG RAN WG2 Meeting #69, R2-101296, Feb. 22-26, 2010.

(Continued)

*Primary Examiner* — Kevin Mew
(74) *Attorney, Agent, or Firm* — Mckenna Long & Aldridge LLP

(57) ABSTRACT

The MTC device receives common control channel (CCCH) configuration information for CCCH configuration of a normal terminal and the MTC CCCH configuration information for CCCH configuration of the MTC device from a base station, selects one MTC CCCH group from a set of the MTC CCCH groups on the basis of the CCCH configuration information and the MTC CCCH configuration information, and transmits or receives data through an the MTC CCCH to which the selected the MTC CCCH group belongs.

15 Claims, 6 Drawing Sheets

(56) References Cited

U.S. PATENT DOCUMENTS

| | | | | |
|---|---|---|---|---|
| 8,428,027 | B2* | 4/2013 | Ou et al. | 370/329 |
| 8,644,277 | B2* | 2/2014 | Zhang et al. | 370/338 |
| 2003/0193915 | A1* | 10/2003 | Lee et al. | 370/335 |
| 2009/0190544 | A1* | 7/2009 | Meylan et al. | 370/329 |
| 2011/0045864 | A1* | 2/2011 | Chen et al. | 455/522 |
| 2011/0274040 | A1* | 11/2011 | Pani et al. | 370/328 |
| 2012/0063302 | A1* | 3/2012 | Damnjanovic et al. | 370/228 |
| 2013/0089062 | A1* | 4/2013 | Ahn et al. | 370/329 |
| 2013/0208668 | A1* | 8/2013 | Ramos et al. | 370/329 |
| 2013/0329673 | A1* | 12/2013 | Kwon et al. | 370/329 |

OTHER PUBLICATIONS

CMCC, "MTC Features, RAN Enhancements and Related Procedures", 3GPP TSG RAN WG2 Meeting #69, R2-101251, Feb. 22-26, 2010.

3GPP TS 23.888 V0.1.0, $3^{rd}$ Generation Partnership Project; Technical Specification Group Services and System Aspects; Service Improvements for Machine-type Communications; (Release 10), Dec. 2009.

Fujitsu, "RAN Impacts of Machine-type Communications for UTRA and EUTRA", 3GPP TSG RAN WG2 Meeting #68bis, R2-100412, Jan. 18-22, 2010.

* cited by examiner

DATA TRANSMISSION METHOD AND APPARATUS OF MACHINE-TYPE COMMUNICATION DEVICE IN WIRELESS COMMUNICATION SYSTEM

BACKGROUND OF THE INVENTION

1. Field of the Invention

The present invention relates to wireless communication and, more specifically, to the data transmission method and apparatus of a machine-type communication apparatus in a wireless communication system.

2. Related Art

A global system for mobile communication (GSM) is wireless technology developed as a system for standardizing a wireless communication system in Europe, and a general packet radio service (GPRS) is technology for providing packet switched data service in circuit switched data service that is provided by GSM. GPRS forms a GSM/EDGE radio access network (GERAN). A universal mobile telecommunication system (UMTS) is a wireless communication system based on wideband code division multiple access (WCDMA). An evolved-UMTS terrestrial radio access network (E-UTRAN) is a wireless communication system based on orthogonal frequency division multiple access (OFDMA).

Machine-type communication (MTC) is one type of data communication including one or more entities that do not require an interaction with a human being. That is, MTC refers to a concept in which a machine device not a mobile station (MS) that is used by a human being performs communication using the existing network, such as a GERAN, a UMTS, or long-term evolution (LTE). A machine device used in MTC may be called an MTC device, and the MTC device includes various devices, such as a vending machine and a machine for measuring the water level of a dam. That is, MTC may be widely applied to a variety of fields. Since an MTC device has a different feature from a common MS, and thus services optimized for MTC may be different from services optimized for human to human communication. MTC may be characterized in different market scenarios, data communication, small costs and efforts, a very large number of potential communication terminals, a wide service area, and low traffic per MS, as compared with the present mobile network communication service.

If an MTC device is deployed in the GERAN, a traffic load on the GERAN may be weighted according to the traffic characteristics of the MTC device. Since this may generate a problem that service for the existing MS may be deteriorated, it is necessary to flexibly manage the allocation of the resources of the MTC device depending on the traffic characteristics of the MTC device and/or current network congestion in order to reduce a traffic load due to the MTC device.

Accordingly, there is a need for an efficient method of controlling congestion that may be generated depending on the traffic of an MTC device.

SUMMARY OF THE INVENTION

The present invention provides a data transmission method and apparatus of machine-type communication (MTC) device in a wireless communication system. The present invention provides a method of improving the operation of the existing GSM/EDGE radio access network (GERAN) so that an MTC device smoothly operates in a GERAN wireless communication system and an influence on the operation of the existing human-to-human (H2H) apparatus is minimized.

In an aspect, a data transmission method of a machine-type communication (MTC) device in a wireless communication system is provided. The data transmission method includes receiving common control channel (CCCH) configuration information for a CCCH configuration of a normal mobile station (MS) and MTC CCCH configuration information for a CCCH configuration of the MTC device from a base station (BS), selecting one MTC CCCH group from a set of MTC CCCH groups based on the CCCH configuration information and the MTC CCCH configuration information, and transmitting or receiving data on an MTC CCCH to which the selected MTC CCCH group belongs.

The CCCH configuration information may comprise a first parameter indicating a number of CCCHs and a second parameter indicating whether a CCCH and a standalone dedicated control channel (SDCCH) are combined or not, and the MTC CCCH configuration information may comprise a third parameter indicating a number of MTC CCCHs and a fourth parameter indicating whether an MTC CCCH and the SDCCH are combined or not.

A sum of the first parameter and the third parameter may be a maximum of 4.

The second parameter and the fourth parameter may be identical with each other.

The one MTC CCCH group may be selected according to an equation MTC_CCCH_GROUP: (BS_CC_CHANS, . . . ((MTC_BS_CC_CHANS−1)+BS_CC_CHANS))=((IMSI mod 1000) mod (MTC_BS_CC_CHANS×N)) div N)+BS_CC_CHANS and PAGING_GROUP (0 . . . N−1)= ((IMSI mod 1000) mod (MTC_BS_CC_CHANS×N)) mod N, where BS_CC_CHANS denotes the first parameter, MTC_BS_CC_CHANS denotes the third parameter, N denotes a number of paging blocks available for one CCCH, IMSI denotes an international mobile subscriber identity, mod denotes a modulo operation, and div denotes an integer division operation.

A size of the MTC CCCH configuration information may be one of 1 bit to 3 bits.

The MTC CCCH may be allocated to at least one of time slots 0, 2, 4, and 6 of a radio frequency channel C0.

The MTC CCCH may be allocated to a time slot 2N when an index of a CCCH group indicated by the CCCH configuration information is N.

In another aspect, a machine-type communication (MTC) device in a wireless communication system is provided. The MTC device includes a radio frequency (RF) unit configured to receive common control channel (CCCH) configuration information for a CCCH configuration of a normal mobile station (MS) and MTC CCCH configuration information for a CCCH configuration of the MTC device from a Base Station (BS), and a processor connected to the RF unit and configured to select one MTC CCCH group from a set of MTC CCCH groups based on the CCCH configuration information and the MTC CCCH configuration information.

A congestion control feature, that is, an MTC feature, can be efficiently embodied.

DESCRIPTION OF EXEMPLARY EMBODIMENTS

Machine-type communication (MTC) is one type of data communication including one or more entities that do not require an interaction with a human being. An MTC device refers to an MS installed for MTC. The MTC device may communicate with an MTC server or can communicate with another MTC device. An MTC feature means a network function of optimizing a network that is used in a machine to machine (M2M) device. The MTC server is an entity that communicates with a network and communicates with an MTC device over the network. The MTC server may have an interface that is accessible to an MTC user. The MTC server provides services for an MTC user. The MTC user uses services provided by an MTC server. An MTC subscriber is an entity which has a contractual relation with a network operator in order to provide services to one or more MTC devices. An MTC group refers to a group of MTC devices that share one or more MTC features and belong to the same MTC subscriber. The MTC subscriber and the MTC group may be mixed and used.

A network is hereinafter illustrated as being a network based on GSM/EDGE radio access network (GERAN), but not limited thereto. The network may be a network based on a variety of methods, such as a UMTS terrestrial radio access network (UTRAN) or an evolved-UTRAN (E-UTRAN).

A mobile station (MS) refers to a wireless device for receiving services based on the GERAN, and it may also be called another terminology, such as user equipment (UE), a user terminal (UT), a subscriber station (SS), a mobile terminal (MT), or a wireless device.

Figure 1:
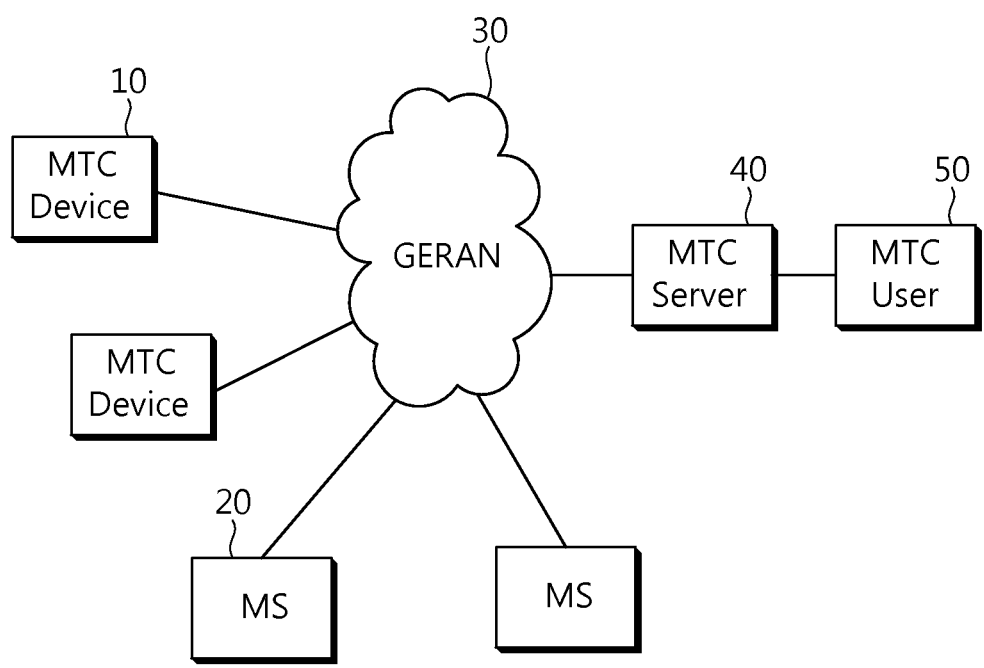
FIG. 1 is an example of a communication scenario for MTC.

FIG. 1 is an example of a communication scenario for MTC. An MTC device 10, together with the existing MS 20, is connected to a network, that is, a GERAN 30. An MTC server 40 receives information about the MTC device 10 over the GERAN 30 and provides the information to an MTC user 50. The MTC server 40 may be directly connected to the GERAN 40, but may be connected to the GERAN 40 through an internet protocol (IP).

Hereinafter, uplink refers to communication from the MTC device 10 or the MS 20 to the GERAN 30, and downlink refers to communication from the GERAN 30 to the MTC device 10 or the MS 20.

The above structure is only illustrative and may be changed in various forms. For example, the MTC device 10 may directly communicate with another MTC device without the MTC server 40.

If the MTC device 10 is disposed in the GERAN 30, a traffic load on the GERAN 30 may be weighted depending on the traffic characteristics of the MTC device 10.

This may generate a problem that service for the existing MS 20 may be deteriorated. Accordingly, in order to reduce a traffic load due to the MTC device 10, it is necessary to flexibly manage the allocation of the resources of the MTC device 10 depending on the traffic characteristic of the MTC device 10 and/or current network congestion.

In MTC, MTC devices may communicate with one or more MTC servers, or MTC devices may communicate with one another.

Figure 2:
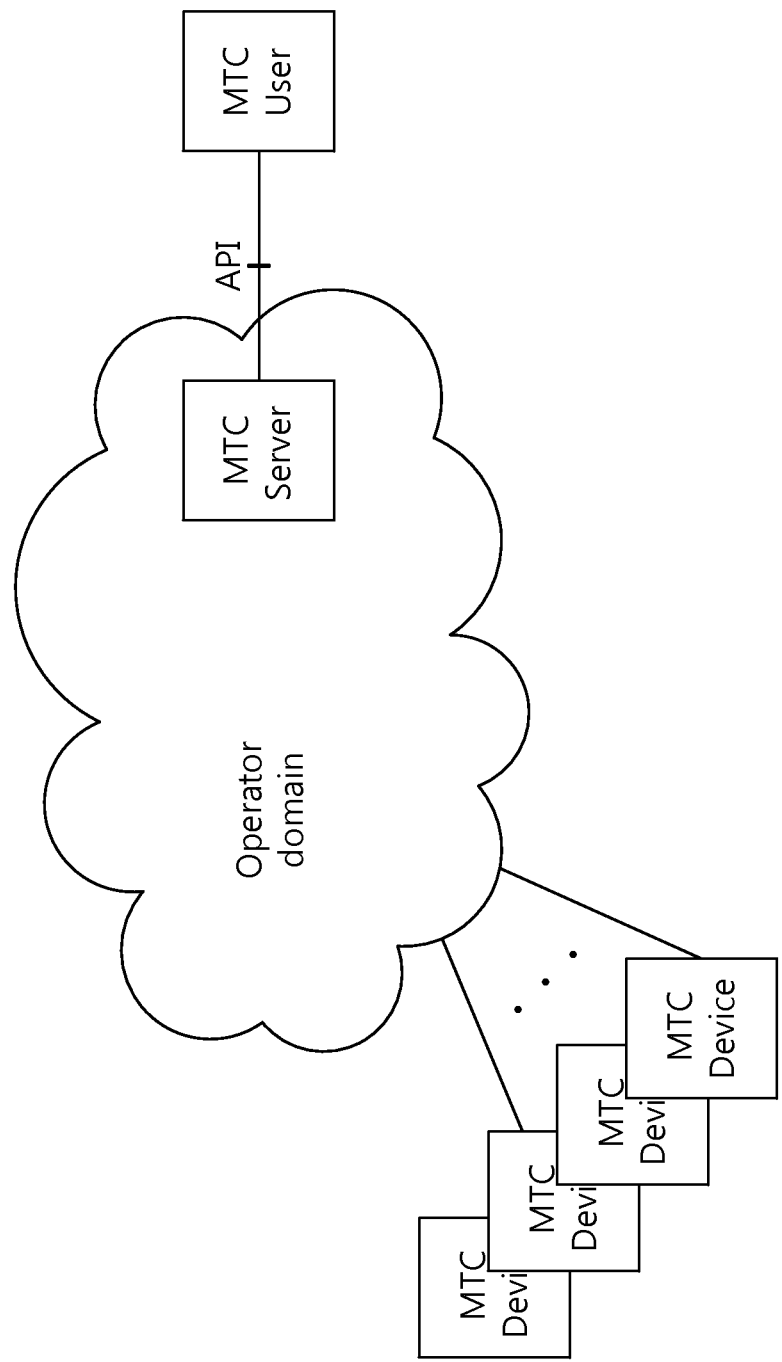
FIGS. 2 and 3 are examples of a conceptual diagram in which MTC devices communicate with an MTC server.
Figure 3:
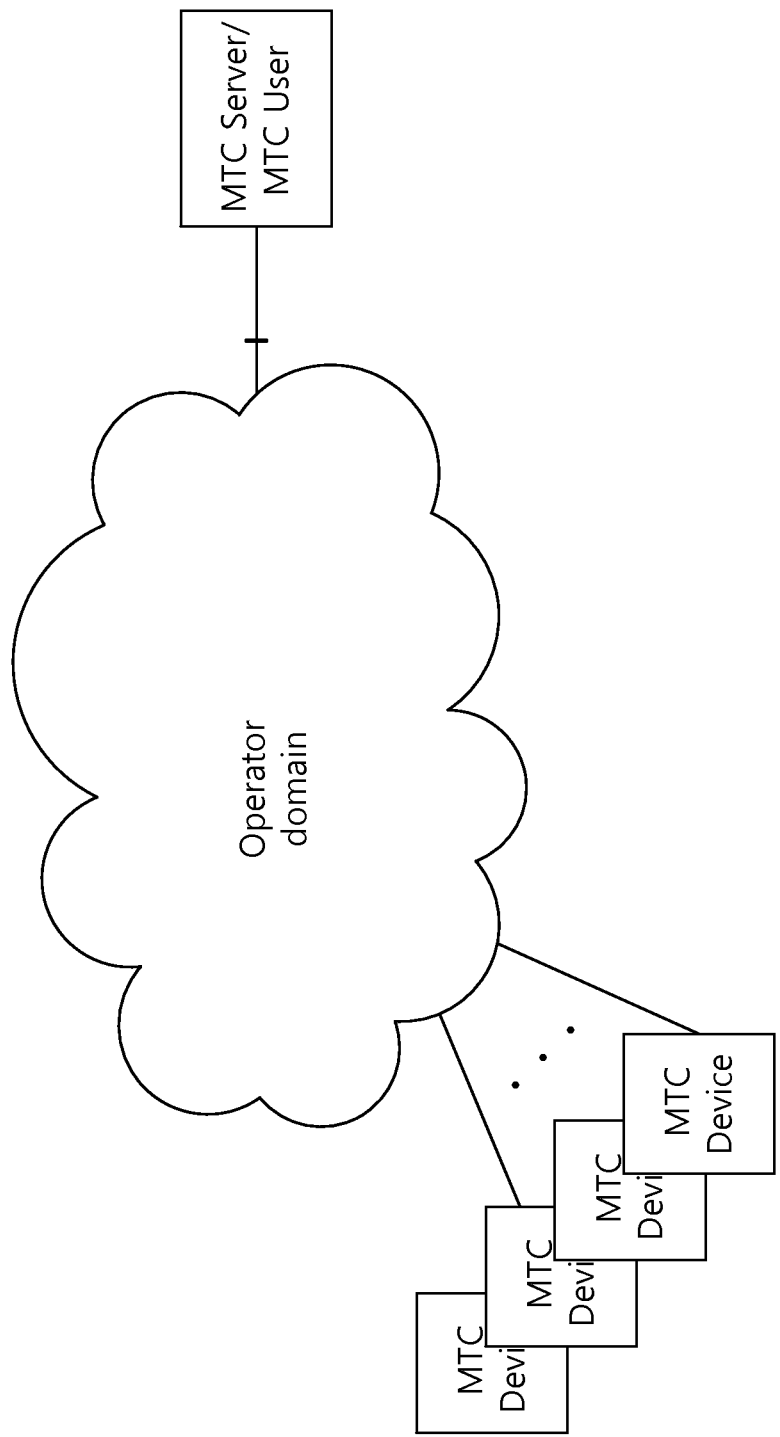

FIGS. 2 and 3 are examples of a conceptual diagram in which MTC devices communicate with an MTC server. Referring to FIG. 2, the MTC server is controlled by a network operator. That is, the MTC server is placed inside a network operator domain. The network operator provides the MTC server with an application programming interface (API), such as an open systems architecture (OSA). An MTC user accesses the MTC server of the network operator through the API. Referring to FIG. 3, an MTC server is not controlled by a network operator. That is, the MTC server is placed outside the network operator domain, and the network operator provides the MTC server with network connectivity.

Figure 4:
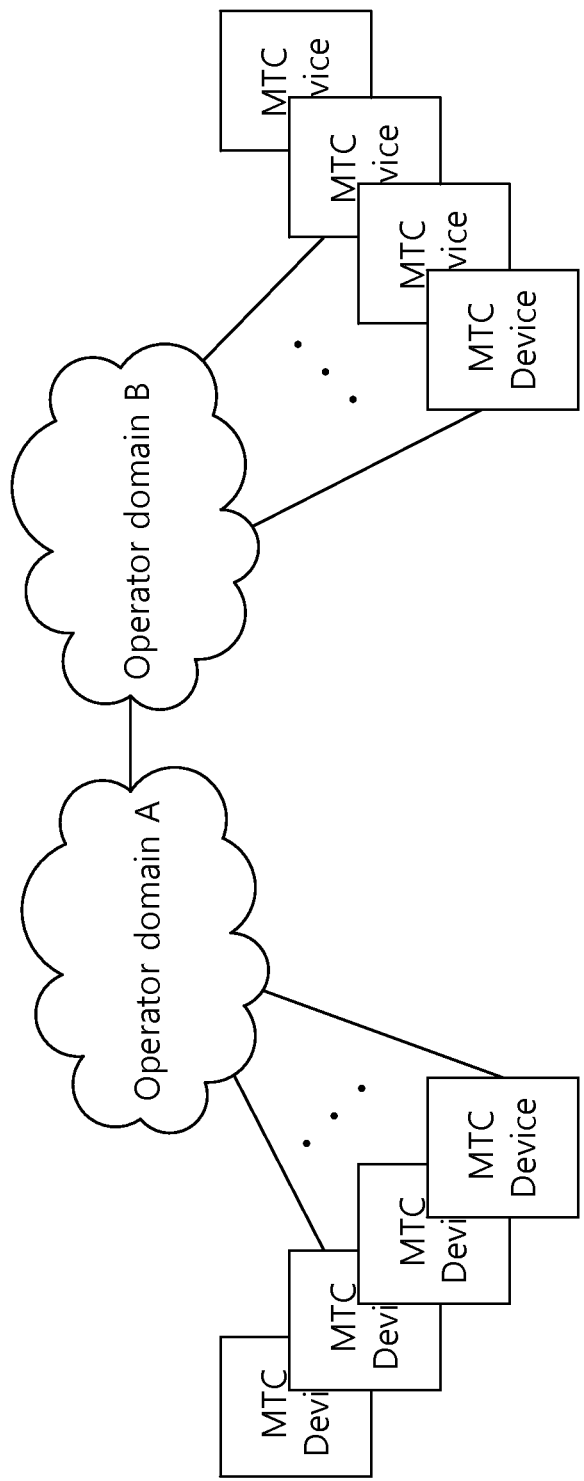
FIG. 4 is an example of a conceptual diagram in which MTC devices directly communicate with one another without an MTC server.

FIG. 4 is an example of a conceptual diagram in which MTC devices directly communicate with one another without an MTC server. Referring to FIG. 4, a network operator A and a network operator B are directly coupled, and MTC devices directly communicate with one another without an MTC server.

All MTC devices do not need to have the same feature because there may be MTC devices of various fields. That is, the optimization of all systems does not need to be suitable for all MTC devices. An MTC feature is defined to provide a structure for a possibility that different systems can be optimized. The MTC feature may be provided based on subscription. Furthermore, the MTC feature may be individually activated.

In order for an MTC device to operate in the existing network, different service requirements from those of a legacy MS are necessary. The service requirements include common service requirements and specific service requirements. For service requirements for MTC features, reference may be made to 3GPP TS 22.368 V1.1.1 (2009-11) "$3^{rd}$ Generation Partnership Project; Technical Specification Group Services and System Aspects; Service requirements for machine-type communications; Stage 1 (Release 10)".

From among the specific service requirements for MTC features, there is a congestion control feature. If congestion is generated by a network load increased due to the operation of an MTC device, the network may restrict traffic from the MTC device that generates the congestion and may not restrict traffic from devices other than the MTC device or traffic from an MTC device that does not generate congestion.

A common control channel (CCCH) is a channel that is used to receive a paging channel (PCH) or transmit a random access channel (RACH). The CCCH may include CCCH configuration information CCCH_CONF that is transmitted through a broadcast control channel (BCCH). The CCCH_CONF indicates the configuration of the CCCH. The CCCH_CONF includes a parameter BS_CC_CHANS indicative of the number of CCCHs. All CCCHs may be allocated using the time slot of a radio frequency channel C0. The C0 may be a BCCH carrier channel. One time division multiple access (TDMA) frame may include eight time slots. A first CCCH may be allocated using the time slot number 0 of a TDMA frame. A second CCCH may be allocated using the time slot number 2 of the TDMA frame. A third CCCH may be allocated using the time slot number 4 of the TDMA frame. A fourth CCCH may be allocated using the time slot number 6 of the TDMA frame. Furthermore, a parameter BS_CCCH_SDCCH_COMB indicating whether a CCCH and a standalone dedicated control channel (SDCCH) have been combined or not is included. If a CCCH and an SDCCH are combined, the number of available RACH and access grant channel (AGCH)/PCH blocks is reduced. Table 1 is an example of BS_CC_CHANS and BS_CCCH_SDCCH_COMB settings according to CCCH_CONF.

TABLE 1

| CCCH_CONF | BS_CC_CHANS | BS_CCCH_SDCCH_COMB |
|---|---|---|
| 000 | 1 | False |
| 001 | 1 | True |
| 010 | 2 | False |
| 100 | 3 | False |
| 110 | 4 | False |

For example, when CCCH_CONF is set to 100, the number of CCCHs that may be used by an MS is 3 and a CCCH and an SDCCH are not combined.

Meanwhile, each CCCH carries a CCCH group selected by each MS in idle mode. The MS selects one CCCH group from a set of available CCCH groups. The MS which has selected a specific CCCH group receives a paging message through only a specific CCCH to which the corresponding CCCH group belongs or transmits an RACH. A maximum of 4 CCCH groups can be configured using the time slot numbers 0, 2, 4, and 6 of a radio frequency channel C0. For example, when a BS configures 2 CCCH groups, the time slot numbers 0 and 2 of C0 become a set of available CCCH groups. An MS selects one CCCH group from a set of the two CCCH groups. Table 2 is an example of an equation in which an MS selects a CCCH group to which the MS belongs.

TABLE 2

CCCH_GROUP (0..BS_CC_CHANS−1) = ((IMSI mod 1000) mod (BS_CC_CHANS × N)) div N
PAGING_GROUP (0..N−1) = ((IMSI mod 1000) mod (BS_CC_CHANS × N)) mod N where
N = number of paging blocks "available" on one CCCH = (number of paging blocks "available" in a 51-multiframe on one CCCH) × BS_PA_MFRMS.
IMSI = International Mobile Subscriber Identity, as defined in 3GPP TS 23.003.
mod = Modulo.
div = Integer division.

Referring to Table 2, an MS may select a CCCH group based on the number of CCCHs BS_CC_CHANS indicated by CCCH_CONF and the international mobile subscriber identity (IMSI) value of the MS. Assuming that the number of available CCCH groups is two, the time slot number 0 of the radio frequency channel C0 may be used as a CCCH if a CCCH group is selected as 0 in accordance with the equation of Table 2 and the time slot number 2 of the radio frequency channel C0 may be used as a CCCH if a CCCH group is selected as 1 in accordance with the equation of Table 2.

In order to embody the congestion control feature, a variety of methods may be proposed. The present invention proposes a method of separating a CCCH for an MTC device that may generate congestion in a GERAN system from a CCCH used by devices other than the existing MTC device. A device other than an MTC device is called a human-to-human (H2H) device. In accordance with the present invention, an influence on an H2H device can be minimized, and congestion due to traffic from an MTC device can also be controlled.

A CCCH for an MTC device may be newly defined. A CCCH for an MTC device is hereinafter called an MTC CCCH. An MTC CCCH may be configured based on MTC CCCH configuration information MTC_CCCH_CONF. The MTC_CCCH_CONF may also include information similar to the existing CCCH_CONF. That is, the MTC_CCCH_CONF includes a parameter MTC_BS_CC_CHANS, indicating the number of CCCHs that are allocated for an MTC device, and a parameter MTC_BS_CCCH_SDCCH_COMB indicating whether an MTC CCCH and an SDCCH are combined or not. Tables 3 and 4 are examples of MTC_BS_CC_CHANS and MTC_BS_CCCH_SDCCH_COMB settings according to MTC_CCCH_CONF when an MTC CCCH is set to a maximum of 1.

TABLE 3

| MTC_CCCH_CONF | MTC_BS_CC_CHANS | MTC_BS_CCCH_SDCCH_COMB |
|---|---|---|
| 0 | 1 | False |
| 1 | 1 | True |

TABLE 4

| MTC_CCCH_CONF | MTC_BS_CC_CHANS | MTC_BS_CCCH_SDCCH_COMB |
|---|---|---|
| 00 | 0 | None |
| 01 | 1 | False |
| 10 | 1 | True |

Table 3 corresponds to the case where MTC_CCCH_CONF is set to 1 bit, and Table 4 corresponds to the case where MTC_CCCH_CONF is set to 2 bits. MTC_BS_CCCH_SDCCH_COMB may be specifically designed for an MTC device or it may comply with BS_CCCH_SDCCH_COMB according to the existing CCCH_CONF. If MTC_BS_CCCH_COMB is specifically given for an MTC device, a base station may allocate some of CCCH resources, allocated to the MTC device, for an SDCCH depending on the number of MTC devices.

Table 5 is an example of MTC_BS_CC_CHANS and MTC_BS_CCCH_SDCCH_COMB settings according to MTC_CCCH_CONF when the number of MTC CCCHs is defined to be two or more.

TABLE 5

| MTC_CCCH_CONF | MTC_BS_CC_CHANS | MTC_BS_CCCH_SDCCH_COMB |
|---|---|---|
| 000 | 0 | None |
| 001 | 1 | False |

TABLE 5-continued

| MTC_CCCH_CONF | MTC_BS_CC_CHANS | MTC_BS_CCCH_SDCCH_COMB |
|---|---|---|
| 010 | 1 | True |
| 011 | 2 | False |
| 100 | 2 | True |
| 101 | 3 | False |
| 110 | 3 | True |

From Table 5, it can be seen that a CCCH for an MTC device can be allocated to a maximum of 3.

Table 6 is an example of the equation in which an MTC device selects an MTC CCCH group to which the MTC device belongs.

TABLE 6

MTC_CCCH_GROUP: (BS_CC_CHANS, .. ((MTC_BS_CC_CHANS−1)+
BS_CC_CHANS)) = ((IMSI mod 1000)
mod (MTC_BS_CC_CHANS × N)) div N)+BS_CC_CHANS
PAGING_GROUP (0 .. N−1) = ((IMSI mod 1000) mod
(MTC_BS_CC_CHANS × N)) mod N where
N = number of paging blocks "available" on one CCCH = (number of paging blocks "available" in a 51-multiframe on one CCCH) × BS_PA_MFRMS.
IMSI = International Mobile Subscriber Identity, as defined in 3GPP TS 23.003.
mod = Modulo.
div = Integer division.

Referring to Table 6, an MTC device may use an $(N+1)^{th}$ CCCH as a CCCH for the MTC device if BS_CC_CHANS is N according to CCCH_CONF setting for the existing H2H device. That is, the MTC device may check a BS_CC_CHANS value according to CCCH_CONF and then use a next CCCH as a CCCH for the MTC device. Furthermore, the sum of the number of CCCHs for the H2H device and the number of CCCHs for the MTC device should not exceed a maximum value of the number of CCCHs that may be supported by a base station.

For example, it is assumed that the number of CCCHs for an H2H device is 2 and the number of MTC CCCHs for an MTC device is 2. That is, this corresponds to the case where BS_CC_CHANS=2 and MTC_BS_CC_CHANS=2. Here, the H2H device may correspond to any one CCCH group of 0 and 1 in accordance with the equation of Table 2, and the H2H device may transmit an RACH or receive a PCH/AGCH through the time slot 0 or the time slot 2 of the channel C0. Furthermore, the MTC device may correspond to any one CCCH group of 2 and 3 in accordance with the equation of Table 6, and the MTC device may transmit an RACH or receive a PCH/AGCH through the time slot 4 or the time slot 6 of the channel C0. The H2H device may perform the existing operation irrespective of whether or not there is a new parameter for the MTC device or the MTC device and transmit an RACH or receive a PCH/AGCH. If a network or a base station does not provide a parameter for the allocation of MTC CCCHs in a system into which an MTC device has been introduced, the MTC device may share a CCCH for an H2H device.

Figure 5:
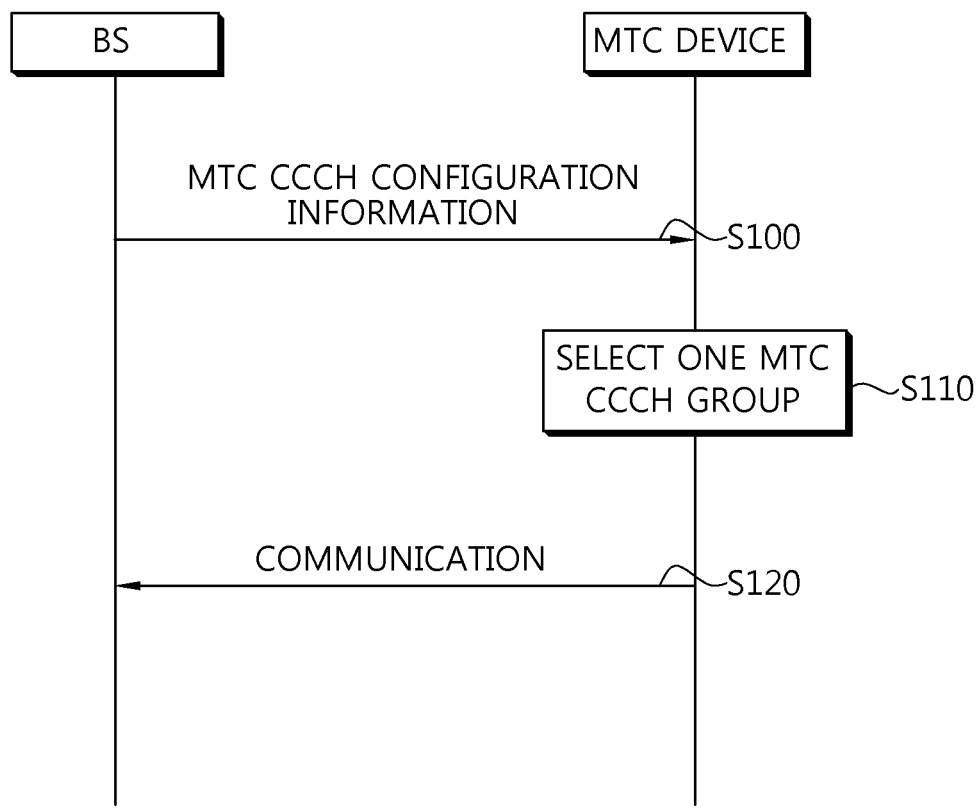
FIG. 5 shows an example of an embodiment of a proposed data transmission method of an MTC device.

FIG. 5 shows an example of an embodiment of a proposed data transmission method of an MTC device.

At step S100, an MTC device receives CCCH configuration information and MTC CCCH configuration information from a BS. At step S110, the MTC device selects one MTC CCCH group from a set of MTC CCCH groups based on the CCCH configuration information and the MTC CCCH configuration information. At step S120, the MTC device transmits or receives data on an MTC CCCH to which the selected MTC CCCH group belongs.

Figure 6:
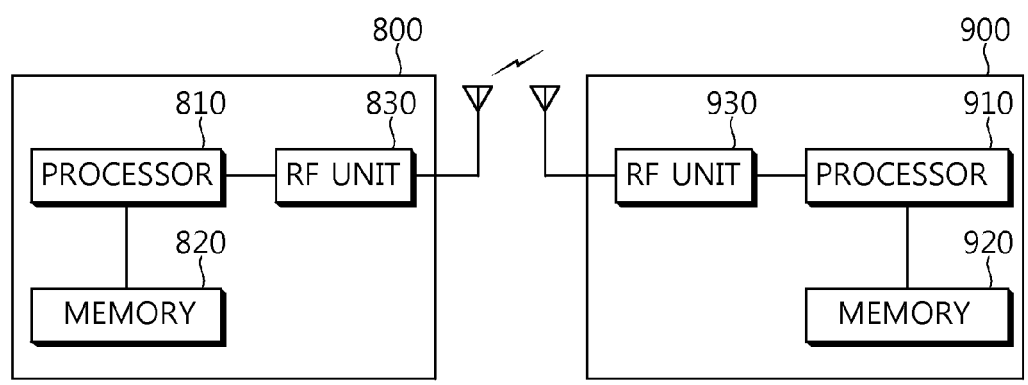
FIG. 6 is a block diagram of a BS and an MTC device in which the embodiments of the present invention are embodied.

FIG. 6 is a block diagram of a BS and an MTC device in which the embodiments of the present invention are embodied.

The BS 800 includes a processor 810, memory 820, and a radio frequency (RF) unit 830. The processor 810 embodies the proposed functions, processes, and/or methods. The layers of a wireless interface protocol may be embodied by the processor 810. The memory 820 is connected to the processor 810, and it stores various pieces of information for driving the processor 810. The RF unit 830 is connected to the processor 810, and it transmits CCCH configuration information and the MTC CCCH configuration information.

The MTC device 900 includes a processor 910, memory 920, and an RF unit 930. The RF unit 930 is connected to the processor 910, and it receives CCCH configuration information and MTC CCCH configuration information and transmits or receives data on an MTC CCCH to which a selected MTC CCCH group belongs. The processor 910 embodies the proposed functions, processes, and/or methods. The layers of a wireless interface protocol may be embodied by the processor 910. The processor 910 selects one MTC CCCH group from a set of MTC CCCH groups based on the CCCH configuration information and the MTC CCCH configuration information. The memory 920 is connected to the processor 910, and it stores various pieces of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A data transmission method of a machine-type communication (MTC) device in a wireless communication system, the data transmission method comprising:
   receiving common control channel (CCCH) configuration information for a CCCH configuration of a normal mobile station (MS) and MTC CCCH configuration information for a CCCH configuration of the MTC device from a base station (BS),
   selecting one MTC CCCH group from a set of MTC CCCH groups based on the CCCH configuration information and the MTC CCCH configuration information, and
   transmitting or receiving data on an MTC CCCH to which the selected MTC CCCH group belongs.

2. The data transmission method of claim 1, wherein:
   the CCCH configuration information comprises a first parameter indicating a number of CCCHs and a second parameter indicating whether a CCCH and a standalone dedicated control channel (SDCCH) are combined or not, and
   the MTC CCCH configuration information comprises a third parameter indicating a number of MTC CCCHs and a fourth parameter indicating whether an MTC CCCH and the SDCCH are combined or not.

3. The data transmission method of claim 2, wherein a sum of the first parameter and the third parameter is a maximum of 4.

4. The data transmission method of claim 2, wherein the second parameter and the fourth parameter are identical with each other.

5. The data transmission method of claim 2, wherein the one MTC CCCH group is selected according to an equation below, MTC_CCCH_GROUP: (BS_CC_CHANS, . . . ((MTC_BS_CC_CHANS−1)+BS_CC_CHANS))=((IMSI mod 1000)mod(MTC_BS_CC_CHANS×$N$))div $N$)+BS_CC_CHANS PAGING_GROUP(0 . . . $N$−1)=((IMSI mod 1000)mod (MTC_BS_CC_CHANS×$N$))mod $N$, where BS_CC_CHANS denotes the first parameter, MTC_BS_CC_CHANS denotes the third parameter, N denotes a number of paging blocks available for one CCCH, IMSI denotes an international mobile subscriber identity, mod denotes a modulo operation, and div denotes an integer division operation.

6. The data transmission method of claim 1, wherein a size of the MTC CCCH configuration information is one of 1 bit to 3 bits.

7. The data transmission method of claim 1, wherein the MTC CCCH is allocated to at least one of time slots 0, 2, 4, and 6 of a radio frequency channel C0.

8. The data transmission method of claim 7, wherein the MTC CCCH is allocated to a time slot 2N, where N denotes an index of a CCCH group indicated by the CCCH configuration information.

9. A machine-type communication (MTC) device in a wireless communication system, the MTC device comprising:
   a radio frequency (RF) unit configured to receive common control channel (CCCH) configuration information for a CCCH configuration of a normal mobile station (MS) and MTC CCCH configuration information for a CCCH configuration of the MTC device from a Base Station (BS); and
   a processor connected to the RF unit and configured to select one MTC CCCH group from a set of MTC CCCH groups based on the CCCH configuration information and the MTC CCCH configuration information.

10. The MTC device of claim 9, wherein:
    the CCCH configuration information comprises a first parameter indicating a number of CCCHs and a second parameter indicating whether a CCCH and a standalone dedicated control channel (SDCCH) are combined or not, and
    the MTC CCCH configuration information comprises a third parameter indicating a number of MTC CCCHs and a fourth parameter indicating whether an MTC CCCH and the SDCCH are combined or not.

11. The MTC device of claim 10, wherein a sum of the first parameter and the third parameter is a maximum of 4.

12. The MTC device of claim 10, wherein the second parameter and the fourth parameter are identical with each other.

13. The MTC device of claim 10, wherein the one MTC CCCH group is selected according to an equation below, MTC_CCCH_GROUP: (BS_CC_CHANS, . . . ((MTC_BS_CC_CHANS−1)+BS_CC_CHANS))=((IMSI mod 1000)mod(MTC_BS_CC_CHANS×$N$))div $N$)+BS_CC_CHANS PAGING_GROUP(0 . . . $N$−1)=((IMSI mod 1000)mod (MTC_BS_CC_CHANS×$N$))mod $N$, where BS_CC_CHANS denotes the first parameter, MTC_BS_CC_CHANS denotes the third parameter, N denotes a number of paging blocks available for one CCCH, IMSI denotes an international mobile subscriber identity, mod denotes a modulo operation, and div denotes an integer division operation.

14. The MTC device of claim 9, wherein a size of the MTC CCCH configuration information is any one of 1 bit to 3 bits.

15. The MTC device of claim 9, wherein the MTC CCCH is allocated to a time slot 2N, where N denotes an index of a CCCH group indicated by the CCCH configuration information.

* * * * *